United States Patent
Hideta et al.

(10) Patent No.: US 9,308,611 B2
(45) Date of Patent: Apr. 12, 2016

(54) TOOL OF MACHINE TOOL

(75) Inventors: Morihiro Hideta, Nara-ken (JP); Koji Sato, Nabari (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 110 days.

(21) Appl. No.: 13/188,191

(22) Filed: Jul. 21, 2011

(65) Prior Publication Data

US 2012/0020748 A1    Jan. 26, 2012

(30) Foreign Application Priority Data

Jul. 21, 2010  (JP) ................................ 2010-163603

(51) Int. Cl.
| | | |
|---|---|---|
| B23Q 11/12 | (2006.01) | |
| B23Q 11/00 | (2006.01) | |
| B23C 5/10 | (2006.01) | |
| B23C 5/16 | (2006.01) | |

(52) U.S. Cl.
CPC ............ B23Q 11/0046 (2013.01); B23C 5/10 (2013.01); B23C 5/16 (2013.01); *B23B 2251/68* (2013.01); *B23C 2230/08* (2013.01); *Y02P 70/171* (2015.11); *Y10T 407/14* (2015.01)

(58) Field of Classification Search
CPC ............... B23Q 11/12; B23Q 11/0042; B23Q 11/0046; B23B 2251/68; B23B 2270/30; B23C 2230/08

USPC ............................ 407/2; 408/67, 58; 409/137
See application file for complete search history.

(56) References Cited

U.S. PATENT DOCUMENTS

| | | | |
|---|---|---|---|
| 6,595,305 B1 * | 7/2003 | Dunn ..................... | B23B 51/00 |
| | | | 175/336 |
| 8,388,279 B2 | 3/2013 | Kitsukawa | |
| 8,622,661 B2 | 1/2014 | Inamasu et al. | |
| 2010/0003097 A1 * | 1/2010 | Kitsukawa ................... | 408/207 |
| 2010/0166510 A1 * | 7/2010 | Inamasu ................... | B23C 5/10 |
| | | | 407/11 |

FOREIGN PATENT DOCUMENTS

| | | | | |
|---|---|---|---|---|
| DE | 19512401 | * | 4/1996 | ............ B23Q 11/00 |
| DE | 102007063204 A1 | * | 6/2009 | .......... B23B 2270/30 |
| EP | 2202019 A2 | * | 6/2010 | ............ B23Q 11/00 |
| JP | 63022244 A | * | 1/1988 | ............ B23Q 11/00 |
| JP | 01-109014 A | * | 4/1989 | ................ B23C 5/06 |
| JP | 2002-166320 B2 | | 6/2002 | |
| JP | 2002307225 A | * | 10/2002 | ................ B23C 5/22 |
| JP | 2010-12523 A | | 1/2010 | |
| JP | 2010-125569 A | | 6/2010 | |
| JP | 2010-149250 A | | 7/2010 | |

* cited by examiner

*Primary Examiner* — Sunil K Singh
*Assistant Examiner* — Ryan Rufo

(57) ABSTRACT

A tool of a machine tool includes a tool body 8 in which there are formed: first suction holes 8d opened near cutting edges 9 and extending toward an axis P of a shaft portion 8a; and a second suction hole 8e to which the first suction holes 8d join and which extends in an axial direction of a spindle 7 and communicates with a chip discharge hole 7a of the spindle 7.

7 Claims, 5 Drawing Sheets

TOOL OF MACHINE TOOL

BACKGROUND OF THE INVENTION

1. Field of the Invention

The present invention relates to a tool of a machine tool, more particularly, to improvement in a suction structure for enhancing collection efficiency of chips generated during cutting machining.

2. Description of the Related Art

Some of the tools of machine tools of this type are provided with a chip suction device for preventing chips generated during workpiece machining from scattering. As a conventional chip suction device of this type, Japanese Patent Application Laid-open No. 2002-166320, for example, discloses one in which a plurality of cutting edges are disposed at a tip of a tool main body so as to be situated on the same circumference, a chip suction hole through which the chips are sucked is formed at a center portion of the tool main body, and a suction mechanism is connected to the suction hole.

SUMMARY OF THE INVENTION

The conventional tool of the machine tool has a problem that a substantial passage area of a chip passage from each of the cutting edges to the chip suction hole becomes large because the chip suction hole is formed at the center portion of the tool main body, and accordingly a flow velocity of a current of sucked air becomes lower, resulting in a weak suction force, and thus the chips cannot be collected sufficiently. Increasing an amount of the sucked air according to the large passage area in order to obtain a necessary flow velocity would necessitate an increase in the diameter of the chip suction hole according to this large amount of the sucked air. However, because there is a limit to the diameter of the suction hole formable in the tool main body, it is difficult for the suction hole to have the necessary diameter.

It is an object of the present invention to provide a tool of a machine tool that makes it possible to improve a suction force and surely collect chips with a simple structure.

The present invention is a tool of a machine tool including a tool body, the tool body including: a shaft portion attachably/detachably loaded to a spindle of the machine tool via a tool holder; a holding portion provided with a plurality of cutting edges; and a suction hole serving as a suction passage of chips during suction of the chips by a chip suction device, wherein the suction hole includes: first suction holes opened near the respective cutting edges and extending toward an axis of the shaft portion; and a second suction hole to which the first suction holes join and which extends in an axial direction of the spindle and communicates with a chip discharge hole of the spindle.

According to the present invention, since the first suction hole opened near the cutting edge is formed in the tool body, for each of the cutting edges, the diameter of each of the first suction holes can be set to a size with which a necessary flow velocity can be obtained, which as a result, makes it possible to increase a suction velocity and suck chips.

In a preferable embodiment of the present invention, in the holding portion of the tool body, concave portions formed so as to be situated on a front side of the cutting edges in terms of a cutting direction and covers covering the concave portions are provided, and the covers and chip inlet ports communicating with the first suction holes via the concave portions are formed between the covers and the cutting edges.

According to the above preferable embodiment, since the concave portions are formed in the holding portion so as to be situated on the front side of the cutting edges in terms of the cutting direction, an operation of attaching/detaching the cutting edges to/from the holding portion can be performed by using the concave portions.

Further, since the covers are provided so as to cover the respective concave portions and the covers and the cutting edges demarcate the chip inlet ports communicating with the portions from the concave portions to the first suction holes, it is possible to obtain a necessary suction velocity from the chip inlet ports to the first suction holes, which makes it possible to prevent the suction velocity from lowering while facilitating the operation of attaching/detaching the cutting edges by providing the concave portions.

In another preferable embodiment of the present invention, a total passage area of the first suction holes is set equal to or less than a passage area of the second suction hole.

According to the above other preferable embodiment, since the total passage area of the first suction holes is set equal to or less than the passage area of the second suction hole, it is possible to prevent a channel resistance from becoming excessively high due to an excessive increase in the flow velocity in the second suction hole while making it possible to obtain a necessary flow velocity near the first suction holes, that is, near the cutting edges.

DETAILED DESCRIPTION OF THE PREFERRED EMBODIMENT

An embodiment of the present invention will be hereinafter described based on the attached drawings.

Embodiment 1

Figure 1:
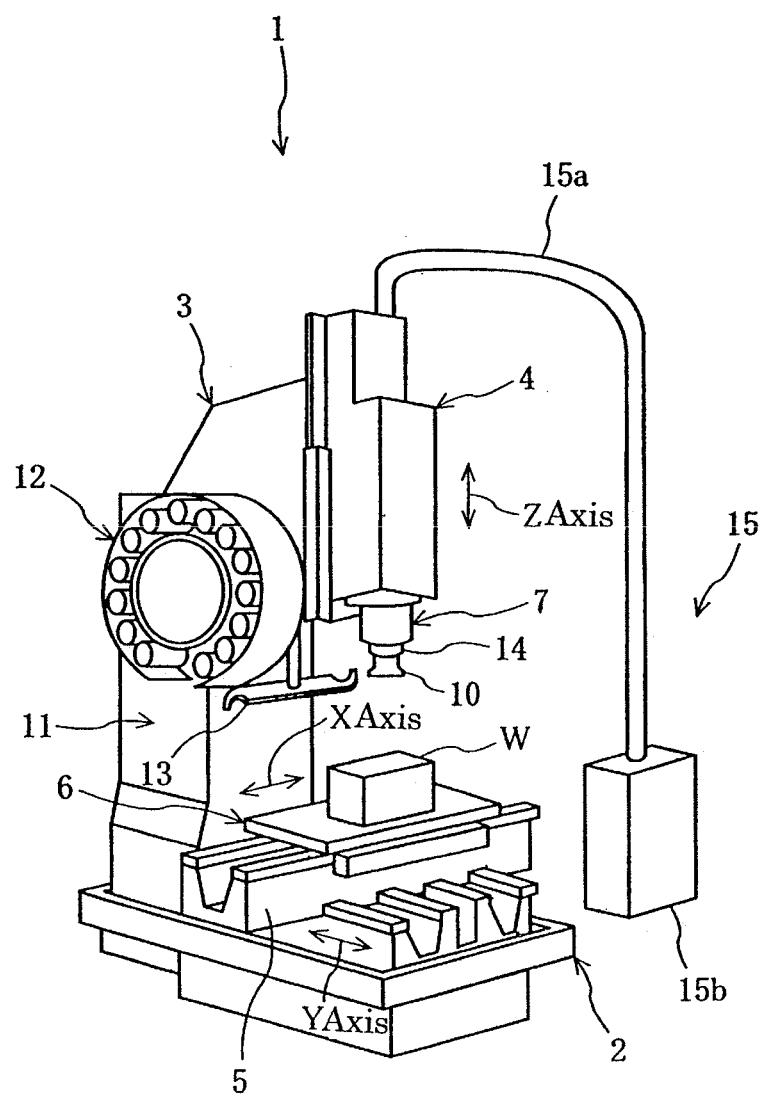
FIG. 1 is a whole perspective view of a machine tool to which a tool according to an embodiment 1 of the present invention is loaded.
Figure 2:
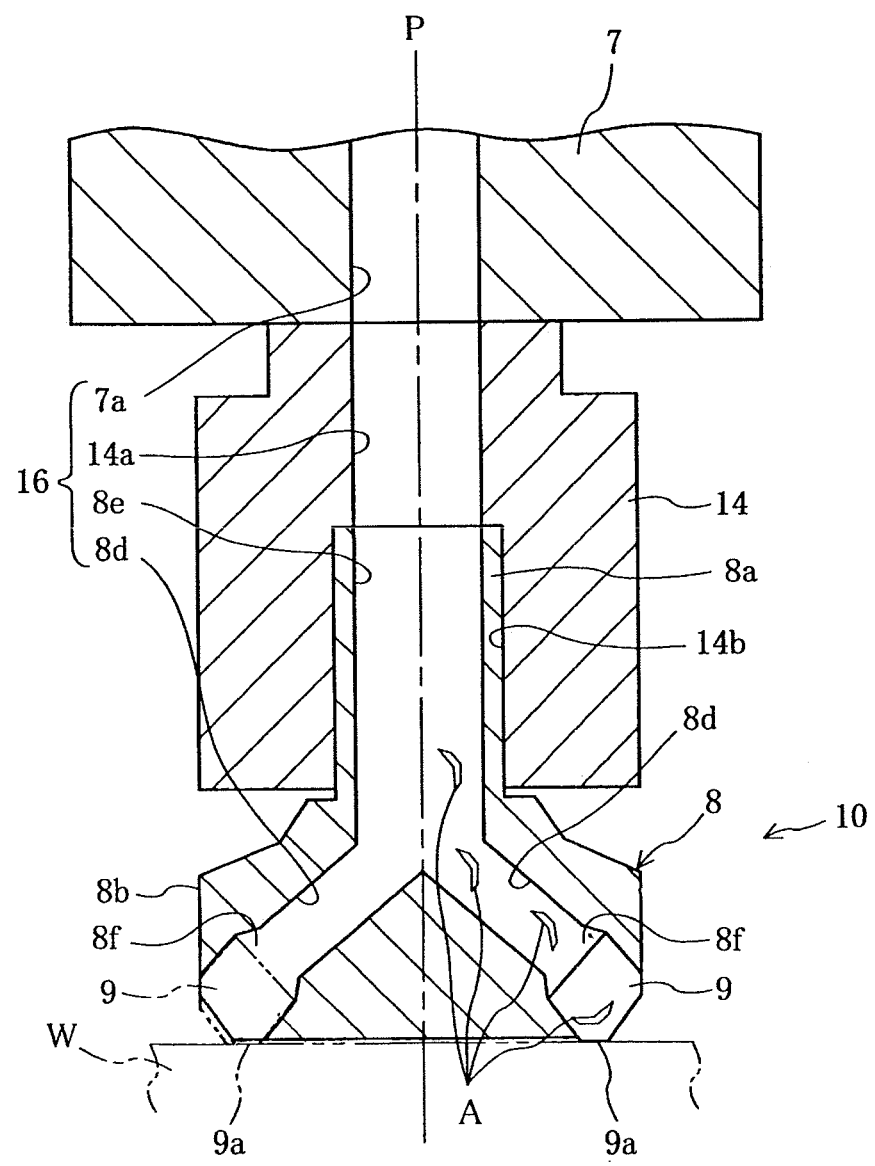
FIG. 2 is a front sectional view (sectional view taken along II-II line in FIG. 3) of the tool.
Figure 3:
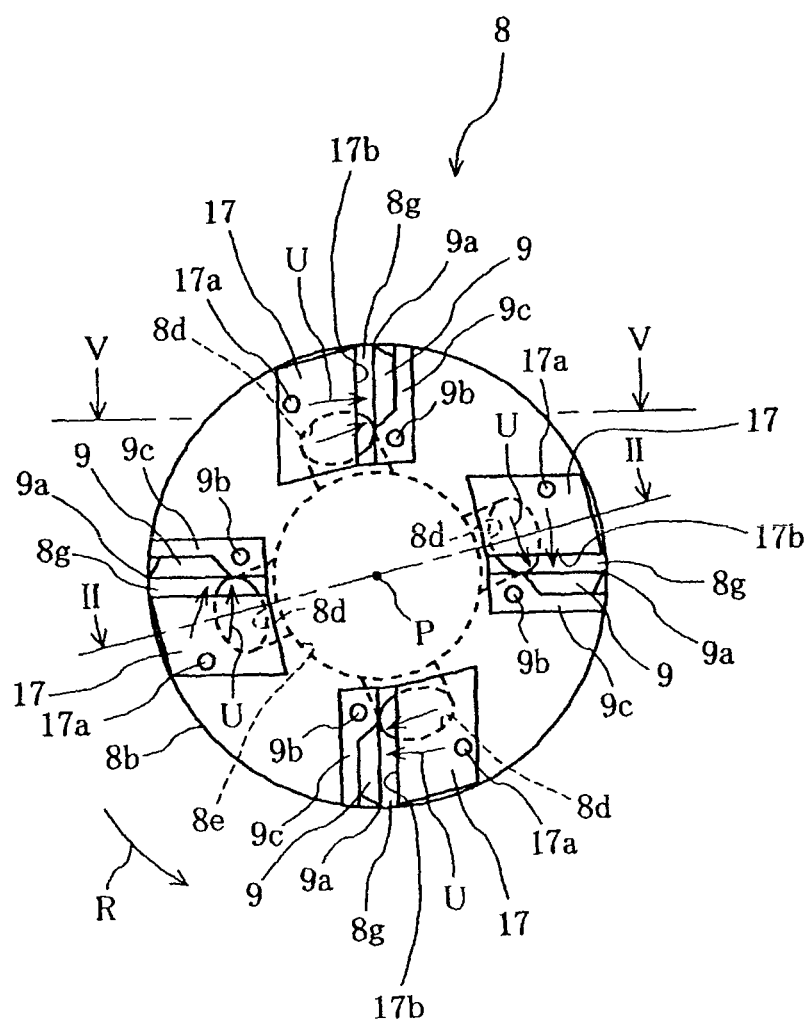
FIG. 3 is a bottom view of the tool with covers attached thereto.
Figure 4:
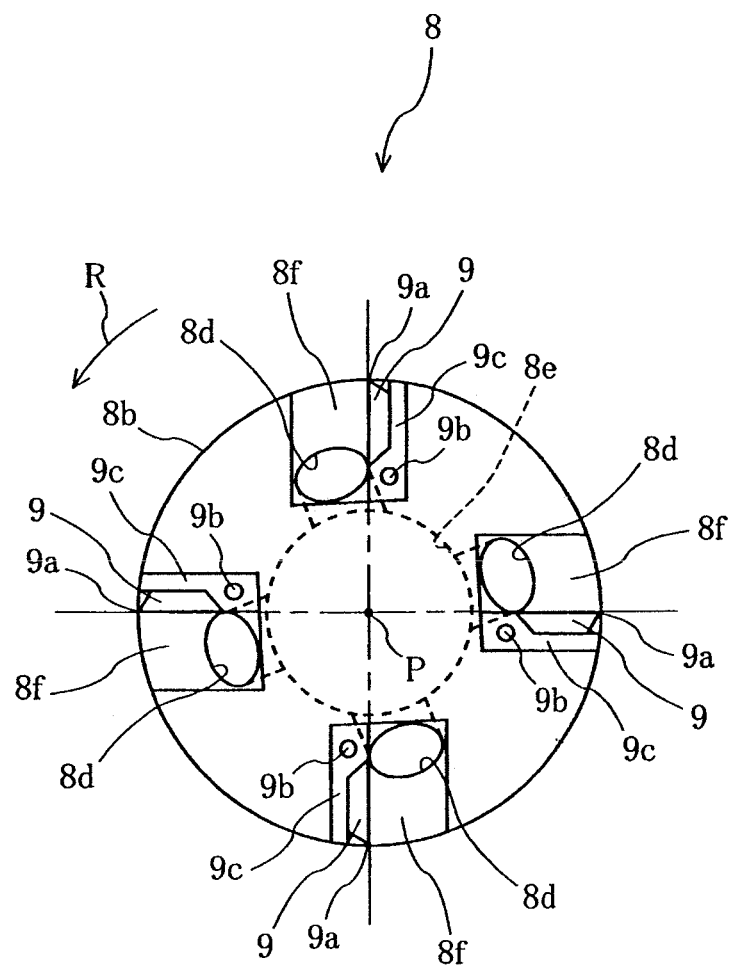
FIG. 4 is a bottom view of the tool with the covers removed therefrom.
Figure 5:
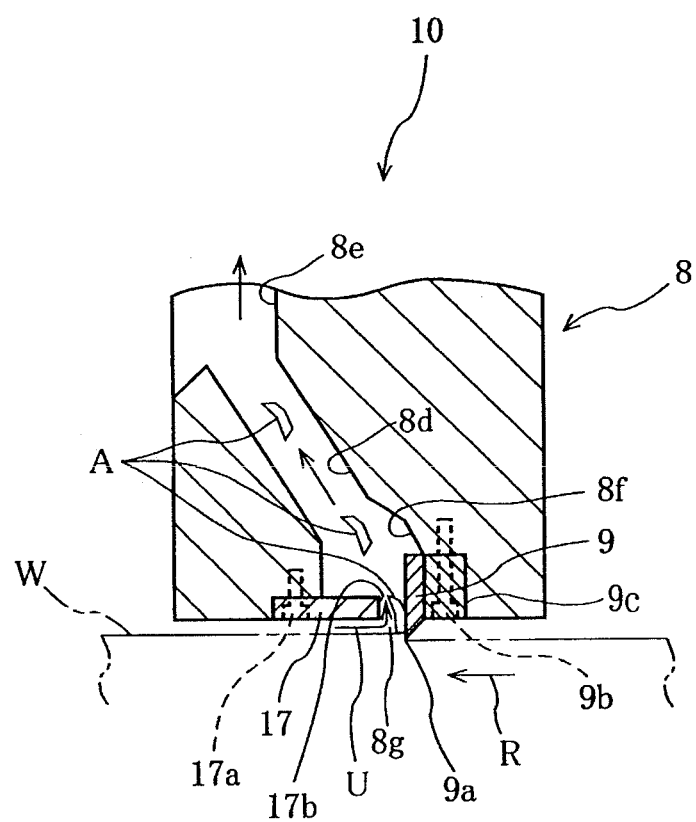
FIG. 5 is a front sectional view (sectional view taken along V-V line in FIG. 3) showing a workpiece machining state of the tool.

FIG. 1 to FIG. 5 are views used to describe a tool of a machine tool according to an embodiment 1 of the present invention.

In the drawings, 1 denotes the machine tool. The machine tool 1 includes: a bed 2; a column 3 provided upright on a back portion of the bed 2; a spindle head 4 supported on a front surface of the column 3 to be movable in an up and down direction (Z-axis direction); a saddle 5 supported on a front portion of the bed 2 to be movable in a back and forth direction (Y-axis direction); and a table 6 supported on the saddle 5 to be movable in a right and left direction (X-axis direction).

In the spindle head 4, a spindle 7 is rotatably supported, and to a lower end portion of the spindle 7, a tool 10 is attachably/detachably loaded via a tool holder 14.

The machine tool 1 further includes an automatic tool changer 11 automatically changing the tool 10 loaded to the spindle 7 to a subsequent-process tool. The automatic tool changer 11 has: a tool magazine 12 disposed on a sidewall of the column 3; and a tool change arm 13 disposed between the tool magazine 12 and the spindle 7.

The machine tool 1 of this embodiment includes a chip suction device 15 sucking chips generated when the tool 10 loaded to the spindle 7 machines a workpiece W.

The chip suction device 15 is roughly structured such that a chip collection box 15b having a built-in suction force generating source and the tool 10 are connected by a suction passage 16, which is formed in the tool 10, the tool holder 14, and the spindle 7, and a suction pipe 15a.

The spindle 7 is made of a cylindrical body in which a chip discharge hole 7a constituting part of the suction passage 16 is penetratingly formed in its axial core. The spindle 7 is rotary driven by a driving motor (not shown) built in the spindle head 4.

In an axial core of the tool holder 14, a support hole 14b to which the tool 10 is loaded and a chip discharge hole 14a constituting part of the suction passage 16 are penetratingly formed, and the tool holder 14 is attachably/detachably loaded to a lower end portion of the spindle 7.

The tool 10 includes: a tool body 8 having a shaft portion 8a and a holding portion 8b; and a plurality of cutting edges 9 loaded to the holding portion 8b, and the shaft portion 8a is attachably/detachably loaded to the tool holder 14.

In the tool body 8, first suction holes 8d and a second suction hole 8e which constitute part of the suction passage 16 are formed. The first suction holes 8d are opened near the respective cutting edges 9 and extend toward an axis P of the shaft portion 8a. Further, the first suction holes 8d join to the second suction hole 8e, and the second suction hole 8e extends in a direction of the axis P of the spindle 7 and communicates with the chip discharge hole 7a of the spindle 7 via the chip discharge hole 14a of the tool holder 14.

Here, a diameter of each of the first suction holes 8d is desirably set so that a total passage area of the first suction holes 8d becomes equal to or less than a passage area of the second suction hole 8e. In this embodiment, the total passage area of the first suction holes 8d is set substantially equal to the passage area of the second suction hole 8e.

In the holding portion 8b of the tool body 8, a concave portion 8f is formed for each of the cutting edges 9 so as to be situated on a front side of the cutting edge 9 in terms of a cutting direction R and so as to open downward. The first suction holes 8d are opened in bottom surfaces of the concave portions 8f. Further, the cutting edges 9 are fixed to base plates 9c, and the base plates 9c are attachably/detachably fixed to edge portions of the concave portion 8f by bolts 9b.

Covers 17 are attachably/detachably placed on lower end openings of the concave portions 8f by bolts 17a. Gaps are provided between edge portions 17b of the covers 17 and the cutting edges 9, and the gaps serve as chip inlet ports 8g communicating with the first suction holes 8d via the concave portions 8f.

In cutting machining of the workpiece W, the tool 10 is rotary driven in the R direction by the spindle 7, a surface of the workpiece W is cut by tips 9a of the cutting edges 9, and chips A are generated. At this time, by the suction force generating source of the chip suction device 15, air around the cutting edges 9 is sucked from the chip inlet ports 8g to the concave portions 8f, passes through the first suction holes 8d, the second suction hole 8e, and the chip discharge holes 14a, 7a which constitute the suction passages 16, and is sucked to the chip collection box 15b via the suction pipe 15a. Owing to an airflow U thus generated, the chips A are sucked from the chip inlet ports 8g into the concave portions 8f, and pass from here through the suction passage 16 and the suction pipe 15a to be collected in the chip collection box 15b.

According to this embodiment 1, since the first suction hole 8d opened near the cutting edge 9 is formed in the tool body 8 for each of the cutting edges 9 and the first suction holes 8d join to the single second suction hole 8e, it is possible to increase a flow velocity of a current of the sucked air in each of the first suction holes 8d, which makes it possible to surely suck the chips A generated during the cutting machining.

Further, since the total passage area of the first suction holes 8d is set equal to or less than, concretely, substantially equal to, the passage area of the second suction hole 8e, it is possible to prevent a channel resistance from becoming excessively high due to an excessive increase in the flow velocity in the second suction hole 8e while making it possible to obtain a necessary velocity near the first suction holes 8d, that is, near the cutting edges 9.

Further, since the concave portions 8f are formed in the holding portion 8b of the tool body 8 so as to be situated on the front side of the cutting edges in terms of the cutting direction R, it is possible to facilitate an operation of attaching/detaching the cutting edges 9 to/from the holding portion 8b by using the concave portions 8f.

Furthermore, since the covers 17 are provided so as to cover the respective concave portions 8f and the chip inlet ports 8g communicating with the concave portions 8f is formed between the covers 17 and the cutting edges 9. It is possible to prevent a suction velocity in portions near the cutting edges 9 from lowering while facilitating the operation of attaching/detaching the cutting edges 9 by providing the concave portions 8f.

In the above embodiment, a description is given of the case where the concave portions 8f each have a shape independent of the first suction hole 8d, but it should be noted that part of the first suction hole may also serve as the concave portion of the present invention.

Further, in the above embodiment, a description is given of the case where the number of the cutting edges is four, but the present invention is applicable to any case where the number of the cutting edges is two or more, and the same number of the first suction holes as the number of the cutting edges are provided.

Further, in the above embodiment, the tool vertically disposed is described, but the present invention is of course applicable to a tool horizontally disposed.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A tool of a machine tool comprising:
   a tool body, the tool body comprising: a shaft portion attachably/detachably loaded to a spindle of the machine tool via a tool holder; a holding portion provided with a plurality of cutting edges; and a suction hole serving as a suction passage of chips during suction of the chips by a chip suction device,
   wherein the plurality of cutting edges are disposed along a peripheral edge of the holding portion of the tool body and are fixed to the holding portion by bolts inserted from underneath; in the holding portion, a plurality of concave portions are formed along the peripheral edge of the holding portion so as to be situated on a front side of the cutting edges, in terms of a cutting direction, the concave portions are open downward and covers are provided so as to cover the openings of the concave portions from underneath, the covers are formed as separate bodies, and gaps between the covers and the cutting edges which communicates with the concave portions, wherein the suction hole includes: a plurality of first suction passageways communicating with the concave portions and extending obliquely upward toward an axis of the shaft portion; and a second suction passageway which is partially formed in an axial core of the tool body so as to extend in a direction of the axis of the shaft portion and to which the plurality of first suction passageways join, and wherein each of the plurality of first suction passageways includes an end abutting corresponding one of the concave portions, and wherein the end is arranged to overlap at least partially with corresponding one of the gaps, when viewed from a bottom of the tool.

2. The tool of the machine tool according to claim 1, wherein
a total passage area of the first suction passageways is set equal to or less than a passage area of the second suction passageway.

3. The tool of the machine tool according to claim 1, wherein
the covers are detachably fixed to the rims of the openings of the concave portions by bolts inserted from underneath.

4. The tool of the machine tool according to claim 1, wherein
the end is visible from the gap in a direction perpendicular to corresponding one of the covers and corresponding one of the gaps.

5. The tool of the machine tool according to claim 1, wherein
the plurality of first suction passageways are offset from the plurality of cutting edges.

6. The tool of the machine tool according to claim 1, wherein each one of the covers has a plate shape, and is configured at the bottom of the tool.

7. The tool of the machine tool according to claim 6, wherein the cutting edges are configured to cut a workpiece on a cutting plane, and each one of the covers extends parallel to the cutting plane.

* * * * *